United States Patent
Ozbaysal et al.

(10) Patent No.: US 11,203,064 B2
(45) Date of Patent: Dec. 21, 2021

(54) SECTION REPLACEMENT OF A TURBINE AIRFOIL WITH A METALLIC BRAZE PRESINTERED PREFORM

(71) Applicant: Siemens Energy, Inc., Orlando, FL (US)

(72) Inventors: Kazim Ozbaysal, Charlotte, NC (US); Ahmed Kamel, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 17/269,294

(22) PCT Filed: Aug. 21, 2018

(86) PCT No.: PCT/US2018/047137
§ 371 (c)(1),
(2) Date: Feb. 18, 2021

(87) PCT Pub. No.: WO2020/040733
PCT Pub. Date: Feb. 27, 2020

(65) Prior Publication Data
US 2021/0308761 A1 Oct. 7, 2021

(51) Int. Cl.
*B22F 5/04* (2006.01)
*B22F 7/06* (2006.01)
(Continued)

(52) U.S. Cl.
CPC .............. *B22F 5/04* (2013.01); *B22F 7/062* (2013.01); *B23K 1/0004* (2013.01);
(Continued)

(58) Field of Classification Search
CPC ......... B23P 6/005; B23K 1/0004; B23K 1/20; B23K 1/0018; B23K 2101/001;
(Continued)

(56) References Cited

U.S. PATENT DOCUMENTS 4,885,216 A * 12/1989 Naik ..................... C22C 19/056
428/680
5,822,852 A 10/1998 Bewlay et al.
(Continued)

FOREIGN PATENT DOCUMENTS

EP 3095550 A1 11/2016
GN 102380678 A 3/2012
(Continued)

OTHER PUBLICATIONS

PCT International Search Report and Written Opinion of International Searching Authority dated Apr. 30, 2019 corresponding to PCT International Application No. PCT/US2018/047137 filed Aug. 21, 2018.

*Primary Examiner* — Matthew P Travers

(57) ABSTRACT

A method of repairing an airfoil is provided. The method includes providing an airfoil with a damaged section and removing the damaged section by machining or cutting an upper section of the airfoil. A replacement section is configured to mate with an upper surface of the airfoil. A presintered preform is provided to join the airfoil and the replacement sections through a resistance brazing process. The presintered preform is configured to mate with the upper surface of the airfoil and a lower surface of the replacement section and inserted between this upper surface and lower surface, creating a stacked airfoil comprising three mated sections in abutting contact. The stacked airfoil is resistance brazed such that only the braze material of the presintered preform melts and the upper surface of the airfoil and the lower surface of the replacement section remain below the grain boundary temperature of the material of the airfoil.

19 Claims, 2 Drawing Sheets

(51) Int. Cl.
  *B23K 1/00* (2006.01)
  *B23K 35/30* (2006.01)
  *B23P 6/00* (2006.01)
  *B23K 35/02* (2006.01)
  *B23K 101/00* (2006.01)
  *B23K 1/20* (2006.01)
  *B33Y 80/00* (2015.01)
(52) U.S. Cl.
  CPC ........ *B23K 1/0018* (2013.01); *B23K 35/0244* (2013.01); *B23K 35/304* (2013.01); *B23P 6/005* (2013.01); *B22F 2007/068* (2013.01); *B23K 1/20* (2013.01); *B23K 2101/001* (2018.08); *B33Y 80/00* (2014.12)
(58) Field of Classification Search
  CPC .............. B23K 35/0244; B23K 35/304; Y10T 29/49318; Y10T 29/49737; B22F 5/04; B22F 7/062–064; B22F 2007/068
  See application file for complete search history.

(56) References Cited

U.S. PATENT DOCUMENTS

| | | | |
|---|---|---|---|
| 2013/0115477 A1* | 5/2013 | Bruck | B23P 6/005 428/609 |
| 2013/0260178 A1* | 10/2013 | Sansom | B23K 1/008 428/686 |
| 2014/0356056 A1* | 12/2014 | Xie | B22F 7/064 403/272 |
| 2016/0339544 A1* | 11/2016 | Xu | B23K 35/0222 |
| 2017/0100805 A1* | 4/2017 | Daniels | F01D 25/24 |
| 2019/0001427 A1* | 1/2019 | Shuck | B23K 1/19 |

FOREIGN PATENT DOCUMENTS

| | | |
|---|---|---|
| RU | 2177862 C1 | 1/2002 |
| RU | 2627558 C1 | 8/2019 |
| SU | 1745449 A1 | 7/1992 |

* cited by examiner

SECTION REPLACEMENT OF A TURBINE AIRFOIL WITH A METALLIC BRAZE PRESINTERED PREFORM

BACKGROUND

1. Field

The present disclosure relates generally to the field of materials technology, and more particularly, to the repair of structural defects in superalloy components such as turbine blades using a presintered preform.

2. Description of the Related Art

Gas turbine engine hot gas path components are typically formed of superalloy materials in order to withstand the high temperature, high stress environment to which they are exposed during operation of the engine. The term "superalloy" is used herein as it is commonly used in the art; i.e., a highly corrosion and oxidation resistant alloy that exhibits excellent mechanical strength and resistance to creep at high temperatures. Superalloys typically include a high nickel or cobalt content. Examples of superalloys include alloys sold under the trademarks and brand names Hastelloy, Inconel alloys (e.g. IN 6203, IN 738, IN 792, IN 939), Rene alloys (e.g. Rene N5, Rene 80, Rene 142), Haynes alloys, Mar M, CM 247, CM 247 LC, C263, 718, X-750, ECY 768, 282, X45, PWA 1483 and CMSX (e.g. CMSX-4) single crystal alloys. Such components are very expensive to manufacture, and in spite of their superior material properties, they are prone to various forms of degradation during engine operation. Degraded components are removed from the engine and replaced. Depending upon the type and degree of degradation, used components may be refurbished and reused at a cost lower than the cost of a new component.

Section replacement of a turbine component typically involves removing the damaged portion of the blade airfoil and replacing it with a replacement section that is structurally similar, i.e., the same superalloy material. The two portions, the remaining airfoil and the replacement section, may be joined through a welding process. However, depending on the material used, traditional welding processes may cause the material to crack. Because nickel base superalloys are prone to grain boundary melting, which may result in the component cracking, weld repair methods that operate at low temperatures such as brazing are best suited for components using these materials. Thus, for a section replacement of a superalloy component such as a turbine blade, utilizing a brazing process is proposed.

SUMMARY

Briefly described, aspects of the present disclosure relate to a method of repairing an airfoil and to a method of joining superalloy components.

A first aspect provides a method of repairing an airfoil. The method includes providing an airfoil with a damaged section and then removing the damaged section by machining or cutting an upper section of the airfoil. A replacement section is provided, configured to mate with an upper surface of the remaining machined or cut airfoil. A presintered preform is also provided to join the airfoil and the replacement sections through a resistance brazing process. The presintered preform is configured to mate with the upper surface of the airfoil and a lower surface of the replacement section wherein the presintered preform comprises a powder mixture of superalloy particles and braze material. The presintered preform is inserted between the upper surface of the airfoil and the lower surface of the replacement section, creating a stacked airfoil comprising three mated sections in abutting contact. The stacked airfoil is resistance brazed such that only the braze material of the presintered preform melts and the upper surface of the airfoil and the lower surface of the replacement section remain below the grain boundary temperature of a material of the airfoil. The melting temperature of the braze material is above the grain boundary melting temperature.

A second aspect of provides a method of joining superalloy components. The method includes providing a first superalloy component with a first surface and a second superalloy component with a second surface configured to mate with the first surface of the first superalloy component. The presintered preform having a third surface is configured to mate with the first surface of the machined airfoil and a lower surface of the replacement section wherein the presintered preform comprises a powder mixture of superalloy particles and braze material. The presintered preform is inserted between the first surface of the first superalloy component and a fourth surface configured to mate with the second surface of the second superalloy component, The presintered preform comprise a powder mixture of superalloy particles and braze material. The presintered preform is inserted between the first surface of the first superalloy component and the second surface of the second superalloy component, creating a stacked structure comprising three mated sections in abutting contact. The stacked structure is resistance brazed such that only the braze material of the presintered preform melts, joining the first surface of the first superalloy component to the second surface of the second superalloy component.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Broadly, the inventor proposes a method of repairing an airfoil. The method repairs the airfoil by a section replacement utilizing a presintered preform. Presintered preforms typically contain a powder mixture of base alloy particles and braze alloy particles that is pre-shrunk so that the particles establish a metallurgical bond. Additionally, presintered preforms do not include a binder material which creates voids. The presintered material is formed in a net shape or is reshaped for use as a preform in a repair process such as that proposed. For the proposed method, the presintered preform is inserted between an upper surface of the airfoil and a lower surface of the replacement section creating a stacked airfoil comprising the three mated sections. The stacked airfoil is resistance brazed such that only the braze material of the presintered preform melts joining the upper surface of the airfoil to the lower surface of the replacement section. The melting temperature of the braze material is above the grain boundary melting temperature of the material of the airfoil.

Figure 1:
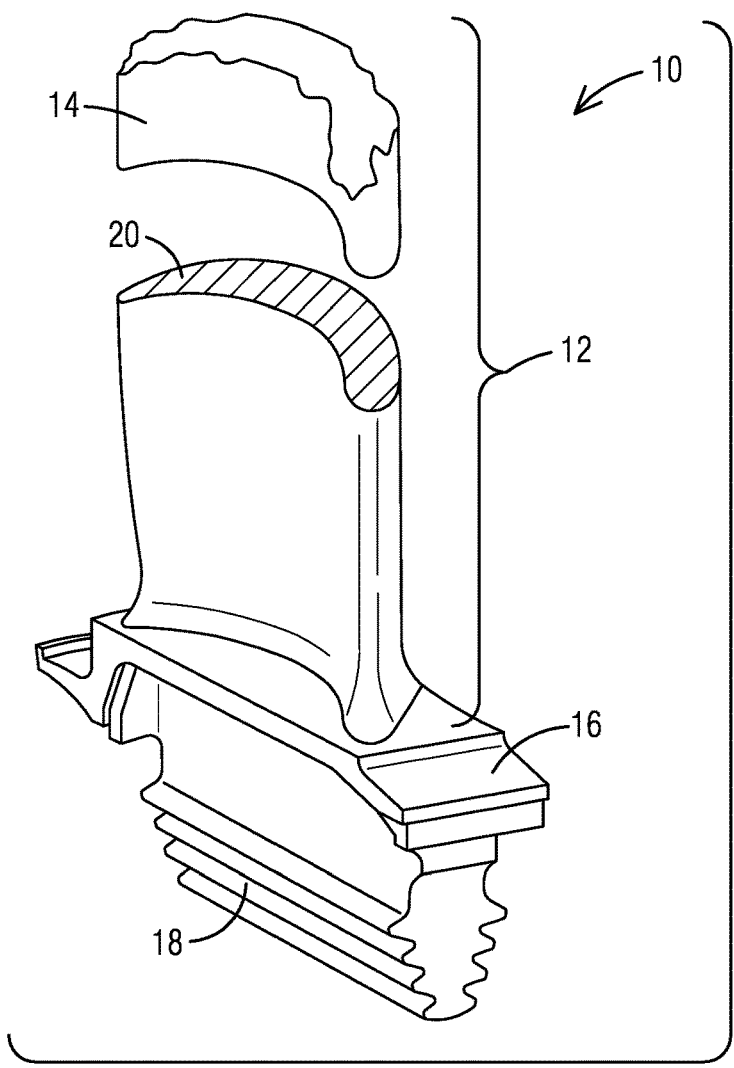
FIG. 1 illustrates a perspective view of a turbine blade undergoing the removal step of the repair process as proposed.
Figure 2:
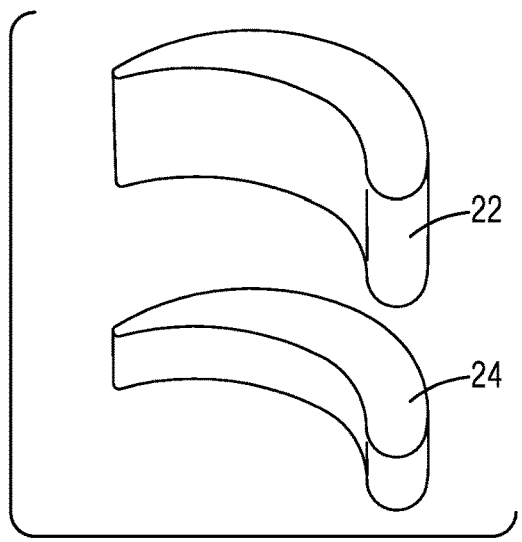
FIG. 2 illustrates a perspective view of a new replacement section and presintered preform to be used in the repair process as proposed.
Figure 3:
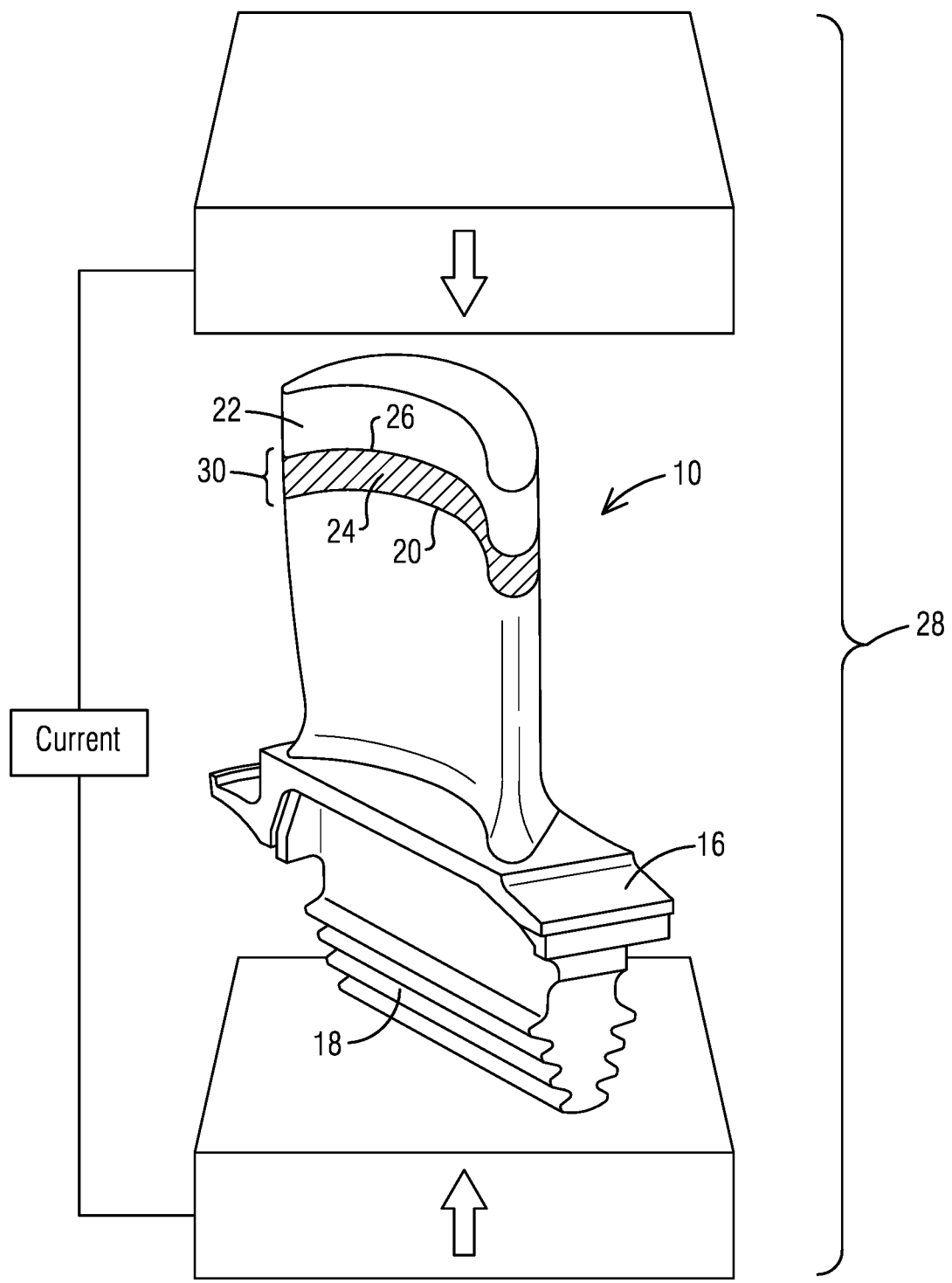
FIG. 3 illustrates perspective view of a turbine blade undergoing the resistance brazing step of the process as proposed.

Referring now to the drawings wherein the showings are for purposes of illustrating embodiments of the subject matter herein only and not for limiting the same, FIGS. 1-3 show a perspective view of a turbomachine engine component, e.g., a gas turbine engine component 10, undergoing a section replacement process with a metallic braze presintered preform utilizing resistance brazing.

As seen in FIG. 1, a turbine blade 10 is illustrated having a root section 18, a platform section 16 and an airfoil 12. The turbine blade 10 is prepared for a repair process by first removing a damaged section 14 of the blade airfoil 12. Removing the damaged section 14 entails machining and/or cutting at least an upper portion of the blade airfoil 12 comprising the damaged section 14. The damage may have occurred by oxidation or erosion, for example, during gas turbine engine operation. Additionally, the upper surface 20 of the remaining blade airfoil may be machined, for example to produce a smooth, flat surface, in order to mate with a surface of a section replacement which will replace the removed damaged section 14.

FIG. 2 illustrates a replacement section 22 and a presintered preform 24 that will be used to repair the blade airfoil 12. In an embodiment, the replacement section 22 is configured to mate with the upper surface 20 of the blade airfoil. The replacement section 22 may be produced by investment casting or additive manufacturing, for example. One skilled in the art would understand that other methods may also be used for the production of the replacement section 22. In an embodiment, the replacement section 22 and the machined airfoil 12 comprise the same material so that the material properties are matched.

The presintered preform 24 used for the repair process is also shown in FIG. 2. The presintered preform 24 may comprise a powder mixture comprising braze material and superalloy particles and formed into an airfoil shape configured to mate with the upper surface 20 of the machined airfoil and a lower surface of the replacement section 22. The presintered preform 24 may include a thickness of approximately 0.0010 in. In an embodiment, the presintered preform 24 may be inserted between the upper surface 20 of the blade airfoil and the lower surface of the replacement section 22 creating a stacked airfoil comprising the three mated sections in abutting contact.

It should be appreciated that under traditional methods of braze repair, when the braze operation is carried out at temperatures higher than the grain boundary melting temperature of the component, grain boundary eutectic melting results which is undesirable. Thus, as mentioned previously, because an objective of the application is to prevent grain boundary melting of the superalloy material of the turbine blade, a brazing procedure where only the braze material melts is preferred. By only melting the presintered braze preform 24 and not heating the faying surfaces of the braze joint during resistant heating, high melting temperature braze materials such as Ni—Cr—Ti, Ni—Cr—Zr, and Ni—Cr—Hf may be used instead of low melting point braze materials such as Ni—Cr—B or Ni—Cr—Si.

In an embodiment, in order to reduce grain boundary melting during the heating portion of the repair process, a pre-heat treatment is conducted on both the machined turbine blade airfoil 12 and the replacement section 22 prior to the heating portion of the repair process. In an alternate embodiment, also to prevent grain boundary melting during the heating portion of the repair process, the upper surface 20 of the remaining blade airfoil and the lower surface 26 of the replacement section may be nickel coated, and preferably electroplated.

In the pre-heat treatment embodiment discussed above, the heat treatment may comprise a double solution heat treatment. The two components, i.e. the machined airfoil 12, and the replacement section 22, would undergo the double solution heat treatment, the second heat treatment at a higher temperature than the temperature of the first heat treatment in order to raise the grain boundary melting temperature and dissolve deleterious phases in each component. In an embodiment, the double solution pre-heat treatment may eliminate approximately between 95-99% of the eutectic gamma prime phases, the major grain boundary melting component in Ni base superalloys. In an embodiment, the heating for the pre-heat treatment may be accomplished utilizing a heating coil surrounding each component.

In the alternate embodiment described above, the joining surfaces of the two components are electroplated, preferably nickel plated, in order to reduce the grain boundary melting. In this embodiment, only the thin layer of nickel deposited on the surfaces through the electroplating process will heat up during the heating portion of the repair process. Because only the nickel layer is heated, grain boundary melting of the two components 12, 22 is reduced/prevented.

As stated previously, the presintered preform 24 may be formed from a powder mixture comprising braze material particles and superalloy particles. In an embodiment, the braze material particles include a powder composition of Ni—Cr—X, wherein X is selected from the group consisting of B, Si, Ti, Zr, and Hf, and combinations thereof.

The superalloy particle composition of the braze material may correspond to the composition of the base metal of the machined airfoil 12. For example, a component, such as a gas turbine blade, may comprise the base metal IN 6203, Rene80, or IN 939. The powder mixture of braze material particles and superalloy particles may comprise a ratio of 80/20 wt. %, 70/30 wt. % or 60/40 wt. %, superalloy particles to braze material particles A powder mixture having a higher proportion of superalloy particles than braze material particles such that the presintered preform 24 is as close to the composition of the superalloy component being repaired is preferable so that the properties of the repaired portion are as close to the properties of the superalloy component as possible. In an embodiment, the superalloy powder is a higher gamma prime alloy than the composition of the airfoil 12. For example, Alloy 247, approximately 65% gamma prime, may be utilized in a presintered preform 24 applied to the joining surfaces of an airfoil composed of Rene 80 or IN 6203 which have less than 65% gamma prime in order to achieve better creep and thermal fatigue properties at the joint section.

In an embodiment, the stacked airfoil is placed into a resistance weld unit 28 and compressed together along the contact surfaces at a selected pressure. The selected pressure and electric current of the resistance weld unit 28 should be sufficient to cause localized melting, but not significantly alter the properties of the joined airfoil 12. The resistance weld unit 28 may comprise a copper cavity such that the stacked airfoil is carried within the copper cavity. A schematic representation of the resistance weld unit 28 may be seen in FIG. 3. Thereafter during the compression, as soon as the surfaces make contact an electric current is passed through the copper cavity and localized heating occurs at the contact surfaces where melting begins. Thus, only the presintered preform 24 and the joining surfaces 20, 26 defining a heated region 30 are heated. Current flow is ceased as soon as the machined airfoil 12 and the replacement section 22 are joined to each other.

In an embodiment, when the braze material used is Ni—Cr—X as described above, the resistance brazing melts the braze in the presintered preform 24 at around 1250° C. The joining surfaces 20, 26 of the airfoil 12 and the replacement section 22 will also reach this temperature, however, when the surfaces 20, 26 have been either pre-heat treated or nickel electroplated as described above, these surfaces 20, 26 will not experience grain boundary melting.

Melting and joining the braze preform 24 on to the faying surfaces in a short period of time without affecting the structure of the airfoil is useful. This process allows the use of high temperature braze materials containing Ni—Cr—X wherein X is Ti, Zr, and Hf to achieve near base metal fatigue properties. In contrast, B and Si containing braze materials form brittle boride and silicides and do not achieve the fatigue capability needed for airfoil operation.

After the heating in the resistance braze process ceases, the joined airfoil 12 is allowed to cool for subsequent removal from the resistance weld unit 28. In an embodiment, a post-repair diffusion heat treatment on the joined airfoil may be performed to homogenize and diffuse the braze material. In an embodiment, the diffusion heat treatment may comprise placing the joined airfoil in a vacuum furnace in which the diffusion heat treatment is conducted below the melting temperature of the braze material.

During the proposed process, the joining airfoil surfaces are not melted, therefore the term resistance brazing is used rather than resistance welding. While this process is carried out in a resistance welding unit, the joining surface temperatures do not reach grain boundary melting as they are well below base metal melting temperatures. Thus, this process is not a welding process.

Thus, the disclosure provides repair process that can join a replacement section to a machined airfoil at a lower temperature, thus, preventing or reducing the grain boundary melting of the airfoil. As grain boundary melting may lead to cracking in the superalloy material, the proposed method may prevent cracking or produce only minimal cracking after the process is complete and the joined component solidifies. While embodiments have been described directed toward turbine blade repair, the proposed method could extend to the repair of other superalloy components. Further, an advantage of the proposed method is that the localized heating along the contact surfaces does not negatively impact structural material properties of the repaired airfoil.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A method of repairing an airfoil, comprising:
    providing an airfoil with a damaged section;
    removing the damaged section by machining or cutting a section of the airfoil;
    providing a replacement section configured to mate with an upper surface of the remaining machined or cut airfoil;
    providing a presintered preform configured to mate with the upper surface of the airfoil and a lower surface of the replacement section wherein the presintered preform comprises a powder mixture of superalloy particles and braze material;
    inserting the presintered preform between the upper surface of the airfoil and the lower surface of the replacement section creating a stacked airfoil comprising the airfoil, the presintered preform, and the replacement section in abutting contact; and
    resistance brazing the stacked airfoil such that only the braze material of the presintered preform melts and the upper surface of the airfoil and the lower surface of the replacement section remain below a grain boundary melting temperature of a material of the airfoil, the resistance brazing joining the upper surface of the airfoil to the lower surface of the replacement section, wherein a brazing temperature of the braze material is above the grain boundary melting temperature.

2. The method as claimed in claim 1, wherein the resistance brazing comprises:
    placing the stacked airfoil into a resistance weld unit;
    compressing the stacked airfoil at a selected pressure;
    passing current through the resistance weld unit so that only a heated region is heated,
    wherein the heated region comprises the presintered preform, the upper surface of the airfoil and the lower surface of the replacement section.

3. The method as claimed in claim 1, wherein the airfoil comprises a superalloy material selected from the group consisting of IN 6203, Rene 80, and IN 939.

4. The method as claimed in claim 3, wherein the replacement section comprises the superalloy material including IN 6203.

5. The method as claimed in claim 4 wherein the resistance brazing heats the presintered preform to a temperature of 1250° C.

6. The method as claimed in claim 3, wherein the superalloy particles of the presintered preform are the same material as the material of the airfoil.

7. The method as claimed in claim 3, wherein the superalloy particles of the presintered preform include a higher gamma prime content than a gamma prime content of the airfoil.

8. The method as claimed in claim 7, wherein the superalloy particles of the presintered preform are Alloy 247 and the superalloy material of the airfoil is IN 6203.

9. The method as claimed in claim 7, wherein the superalloy particles of the presintered preform are Alloy 247 and the superalloy material of the airfoil is Rene 80.

10. The method as claimed in claim 1, further comprising pre-heat treating the airfoil and the replacement section prior to the resistance brazing.

11. The method as claimed in claim 10, wherein the pre-heat treatment comprises a double solution heat treatment.

12. The method as claimed in claim 1, further comprising nickel electroplating the upper surface of the airfoil and the lower surface of the replacement section prior to the resistance brazing.

13. The method as claimed in claim 1, further comprising diffusion heat treating the joined airfoil after the resistance brazing at a temperature below the melting temperature of the braze material to diffuse elements in the braze material.

14. The method as claimed in claim 1, wherein the replacement section is produced by investment casting.

15. The method as claimed in claim 1, wherein the replacement section is produced by additive manufacturing.

16. The method as claimed in claim 1, wherein the the powder mixture comprises braze material particles and superalloy particles, and
wherein the braze material particles have a composition of Ni—Cr—X, wherein X is selected from the group consisting of B, Si, Ti, Zr, and Hf, and combinations thereof.

17. The method as claimed in claim 1, wherein the presintered preform is formed from a powder mixture comprising in a weight percentage 70% superalloy particles to 30% braze material particles.

18. The method as claimed in claim 1, wherein the airfoil is selected from the group consisting of turbine blade and turbine vane.

19. A method of joining superalloy components, comprising:
providing a first superalloy component with a first surface and second superalloy component with a second surface configured to mate with the first surface of the first superalloy component;

providing a presintered preform having a third surface configured to mate with the first surface of the first superalloy component and a fourth surface configured to mate with the second surface of the second superalloy component wherein the presintered preform comprises a powder mixture of superalloy particles and braze material;

inserting the presintered preform between the first surface of the first superalloy component and the second surface of the second superalloy component creating a stacked structure comprising the first superalloy component, the presintered preform, and the second superalloy component in abutting contact; and resistance brazing the stacked structure such that only the braze material of the presintered preform melts, joining the first surface of the first superalloy component to the second surface of the second superalloy component, wherein a brazing temperature of the braze material is above a grain boundary melting temperature of the first and second superalloy components, and wherein the first surface and the second surface remain below the grain boundary melting temperature.

* * * * *